United States Patent [19]
Pai et al.

[11] Patent Number: 5,668,571
[45] Date of Patent: Sep. 16, 1997

[54] METHOD AND APPARATUS FOR GENERATING HARDWARE ICONS AND CURSORS

[75] Inventors: Prakash Pai, Loma Linda; Vlad Bril, Campbell, both of Calif.

[73] Assignee: Cirrus Logic, Inc., Fremont, Calif.

[21] Appl. No.: 316,014

[22] Filed: Sep. 30, 1994

[51] Int. Cl.⁶ .......................................... G09G 1/00
[52] U.S. Cl. .......................... 345/113; 345/145; 345/348
[58] Field of Search .................... 345/113, 118, 345/120, 133, 145, 199; 395/159, 348

[56] References Cited

U.S. PATENT DOCUMENTS

| | | | |
|---|---|---|---|
| 5,361,081 | 11/1994 | Barnaby | 345/145 |
| 5,386,505 | 1/1995 | Beattie et al. | 395/158 |
| 5,412,399 | 5/1995 | Hara | 345/113 |
| 5,479,599 | 12/1995 | Rockwell et al. | 395/155 |
| 5,515,495 | 5/1996 | Ikemoto | 395/159 |

*Primary Examiner*—Mark R. Powell
*Attorney, Agent, or Firm*—Frank Nguyen

[57] ABSTRACT

An apparatus and a method for generating hardware icons and cursors to be used as graphical computer command and control. More particularly, hardware cursors can be used to select and manipulate hardware icons. In order to enable hardware cursors to select and manipulate hardware icons, the invention teaches the use of a display priority order in which hardware cursor has the highest priority followed by hardware icons and graphics display. The current invention also teaches synchronizing the horizontal pixel count and synchronizing the vertical line count for generating both hardware icons and cursors. Such synchronization allows a determination of whether a hardware cursor overlaps with a hardware icon to be made. This determination triggers an interrupt signal to alert the CPU about such overlap.

32 Claims, 8 Drawing Sheets

DISPLAY PRIORITY SCHEME

DISPLAY PRIORITY SCHEME

DISPLAY PRIORITY SCHEME (CURRENT INVENTION)**

(CURRENT INVENTION)**

| SEL (1) | SEL (0) | MUX OUTPUT |
|---|---|---|
| 0 | 0 | CURSOR PEL-ADD |
| 0 | 1 | ICON PEL-ADD |
| 1 | 0 | IMAGE ADD |
| 1 | 1 | IMAGE ADD |

FIG. 6

METHOD AND APPARATUS FOR GENERATING HARDWARE ICONS AND CURSORS

FIELD OF THE INVENTION

This invention relates generally to the use of hardware icons and hardware cursors in computer graphics display. More particularly, the present invention relates to improvements made to enable hardware cursors to select and manipulate hardware icons for control and command purposes.

BACKGROUND OF THE INVENTION

Graphical user interface (GUI) programs such as the WINDOWS™ program, the IBM™ OS/2™ program, or the APPLE™ System 7.1 program are commonly used to make micro-computers more user friendly. The primary reason GUI programs make micro-computers more user friendly is they allow users to manipulate software-generated icons such as a screen menu to achieve a task. The IEEE defines an icon as "a symbol that is a pictorial indication of a command or object and is located on a graphics tablet or an on-screen menu." To clearly convey to users their intended functions, software icons are represented graphically by universally recognized symbols. For example, the icon of a "trash-can" unmistakably communicates to users that the icon is associated with the removal or deletion of files.

A cursor is a "moveable" marker that indicates a position (e.g., the mouse's position) on a display screen. The difference between a cursor and other icons appears to be their functions. While a cursor, which is normally associated with a computer mouse, is used in pointing and indicating a screen position, an icon is more "static" in nature and is a pictorial representation of a command or object. To be further effective in communicating to users the mouse's current position, cursors can change their shapes when they move between different areas of the display screen (i.e., from a background area to an area where an application-software is being displayed). Likewise, icons can also change their shapes to better communicate to users the state of their intended functions. Consider the trash-can icon example discussed earlier, when the trash-can contains items to be discarded, it has an inflated shape as compared to the straight shape when it is empty. Thus, by using cursors together with icons, users no longer have to perform computer related tasks by codes.

In the prior art, icons and cursors have been exclusively software based. That is these icons and cursors were generated by GUI programs such as WINDOWS™, IBM™ OS/2™, or APPLE™ System 7.1. In addition to requiring a GUI program to generate, software icons suffer from performance delays because additional software layers require additional clock cycles to read icon data from memory and write/rewrite the data on the screen every time an icon is manipulated or executed. On the other hand, hardware icons are generated almost exclusively by computer hardware components dedicated to the task with little or no software involved. Hardware icons provide a solution to these challenges because they do not require the use of GUI programs. Hence, they do not suffer from delays.

Currently, however, the use of hardware icons has been rather limited. This is because of the display priority scheme associated with the prior art. Particularly, a hardware cursor can not easily be used to select or manipulate hardware icons. With respect to CPU access, in the prior art, hardware icons have top priority, hardware cursors have the next highest priority, and software-based graphics have the lowest priority. This order of priority is shown in FIG. 3A. In other words, hardware icons have the highest priority and would override both a hardware cursor and a software cursor when it comes to graphics display. Because of this priority scheme, when a hardware cursor is pointed at a hardware icon, the cursor goes underneath and is hidden by the icon. This scenario is illustrated in FIG. 3B. FIG. 3B shows display screen 300 which displays hardware cursor 304, hardware icon 302, and software-based graphic background 301 relative to each other. Because of the priority order scheme, hardware cursor 304 is hidden by hardware icon 302 when the two overlap. FIG. 3B also shows how hardware cursor 303 and background 301 are displayed relative to each other (i.e., the overlapped portion of background 301 is hidden under hardware cursor 303).

As such, when multiple hardware icons are simultaneously displayed and are positioned next to each other, it becomes a difficult task to visualize and consequently to maneuver the cursor to the desirable icon for selecting or manipulating that icon. The ability to visualize the hardware cursor while manipulating hardware icons is greatly reduced when there are multiple hardware icons displayed in close proximity of each other on the display screen. Similarly, because of the lower priority of graphics display relative to hardware icons, software cursors also experience the same problem as hardware cursors under the prior art scheme. As a result, hardware icons have been used to only generate images for graphics display purposes. In other words, application of hardware icons has not been extended to pictorial representation of computer command and control. Such application of hardware icons is desirable because it represents a flexible and independent way for users to communicate with the computer.

Another challenge associated with using computer icons to graphically represent computer command and control is overlap detection. In communicating to the computer that a cursor is attempting to select or manipulate a particular icon, a determination needs to be made that the cursor is pointed at the icon on the monitor screen. This is done by comparing the current position of the cursor with that of the icon. More specifically, the boundaries of the cursor and the icon at that particular time are compared. If the boundaries of the cursor overlap that of the icon, a determination is made that the cursor is pointed at the icon. If an overlap is detected, the cursor can be used to either select or manipulate the icon. In the prior art, overlap detection has been made with software mainly because hardware icons have not been used to graphically represent computer command and control. It is desirable to perform the icon-cursor overlap comparison and determination with hardware rather with software because added layers of software normally mean performance delays and inefficiency (optimization).

Thus, what is needed is a method and apparatus for generating hardware icons to graphically represent a computer command and control. In particular, a method and apparatus for using a hardware cursor to select and manipulate hardware icons, which graphically represent computer commands and controls, so as to provide a flexible and independent way to communicate with the computer. What is further needed is a method and apparatus that determines through hardware, whether a hardware cursor is within the range of any hardware icon and if so, automatically triggers the computer command associated with that hardware icon.

BRIEF SUMMARY OF THE INVENTION

The current invention provides for command and control of a computer using hardware icons. In short, hardware icons are used to graphically represent computer commands. For example, customized screen menus, similar to those generated by GUI programs, can be made up of hardware icons. As such, hardware icons offer an alternative to GUI programs in providing a user friendly working environment to computer users. Moreover, hardware icons can also serve as means to alert a user about the current status of his computer's critical components. For instance, hardware icons can be used to alert a user about the battery life of his lap top computer. Similarly, hardware icons can be used to alert a user of the time, date, or any appointment that he might have. Again, all of this can be achieved without the need of GUI programs.

In using hardware icons as graphical computer commands, the capability of using a hardware cursor to select and manipulate hardware icons is crucial. Previously, such capability was very limited because of the display priority scheme in the prior art. The current invention solves this problem by changing the display priority order. In the new priority scheme, hardware cursor has the highest priority followed by hardware icons and graphics display. This new priority scheme is shown in FIG. 4A. The change in priority allows a hardware cursor to be displayed when it overlaps with a hardware icon thereby greatly enhancing its ability to select and manipulate hardware icons. This scenario is illustrated in FIG. 4B. FIG. 4B shows display screen 400 which displays hardware cursor 404, hardware icon 402, and software-based graphic background 401 relative to each other. Due to the new priority order scheme, hardware cursor 404 is displayed on top of hardware icon 402 when the two overlap. FIG. 4B also shows how hardware cursor 403 and background 401 are displayed relative to each other (i.e., the overlapped portion of background 401 is hidden under hardware cursor 403).

The present invention also provides for using hardware to detect whether a hardware cursor is pointed at a hardware icon (i.e., the cursor and icon are overlapped) on a display device (i.e., monitor screen or flat panel like liquid crystal display). If a hardware cursor is deemed to point at a hardware icon, an interrupt signal is generated to direct the CPU to perform the desired task associated with the icon.

It is an object of the present invention to provide a video graphics controller that utilizes hardware icons and cursors to communicate with the computer CPU (i.e., to use hardware icons and cursors to pictorially represent computer commands and controls).

It is a further object of the present invention to devise an alternative priority display scheme to enable users to use a hardware cursor to select and manipulate hardware icons in communicating with a computer.

A still further object of the present invention is to provide a video graphics controller that detects whether a hardware cursor overlaps hardware icons by using hardware.

BRIEF DESCRIPTIONS OF THE DRAWINGS

FIG. 6 illustrates the selection code used in the present invention in carrying out the priority scheme of FIG. 5.

DETAILED DESCRIPTION OF THE PREFERRED EMBODIMENT

The preferred embodiment of the present invention is included in Part Nos. CL-GD7541, CL-GD7542, and CL-GD7543 which are manufactured and marketed by Cirrus Logic, Inc. of 3100 West Warren Ave., Fremont, Calif. 94538.

Figure 1:
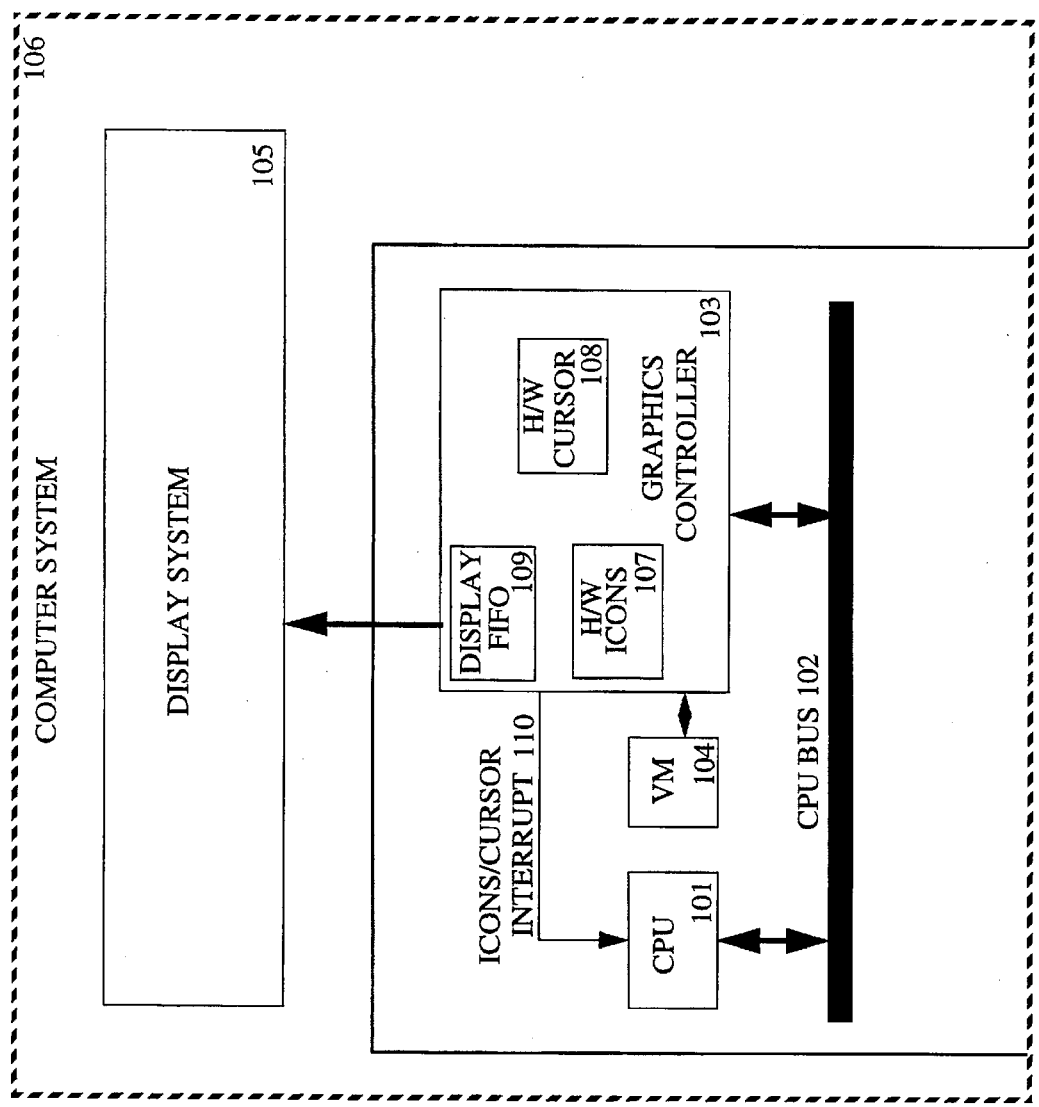
FIG. 1 illustrates a block diagram of the overall computer system utilizing the present invention.

The present invention can be described more easily by first referring to a high level block diagram such as FIG. 1 that shows a computer system 106 with a VGA graphics display in which the present invention may be employed. This system includes computer CPU 101, CPU bus 102, VGA graphics controller 103, video memory 104, and display system 105. Computer CPU 101 interfaces with VGA graphics controller 103 through CPU bus 102. The hardware to generate icons 107, the hardware to generate cursor 108, and the display FIFO 109 all reside within graphics controller 103.

In the prior art, display FIFO 109 acted as a graphics display buffer for GUI programs which typically require many CPU cycles to execute its instructions (e.g., decoding and translating GUI codes to machine codes). Moreover, even after a higher level GUI instruction is reduced to machine code, the CPU is still needed to ensure that the instruction is properly carried out. In a typical scenario, computer CPU 101 sends a "frame of image" control signal to VGA graphics controller 103. This control signal commands VGA graphics controller 103 to access video memory 104 to retrieve a video image stored at a particular memory address. Upon retrieving this image from video memory 104, VGA graphics controller 103 processes the image prior to sending it to display system 105. To ensure that the task is properly carried out, CPU 101 periodically communicates with the graphics controller using "handshake" signals. Consequently, every time a graphics image changes (e.g., moved from one location on the screen to another) the whole scenario is repeated and computer CPU 101 has to oversee the entire scenario. Because the CPU oversees simultaneously many different tasks on a time shared basis, the CPU's utilization should be reduced in order to optimize efficiency.

Conversely, the present invention requires fewer CPU cycles to generate icons and cursors because it utilizes specially designed hardware and not a GUI program. Furthermore, the present invention minimizes the involvement of CPU 101 in generating icons by incorporating controls related to these tasks into the hardware 107 and 108 thereby limiting the role of CPU 101 to communicating to graphics controller 103 essential information such as the cursor or icon display position.

Figure 2:
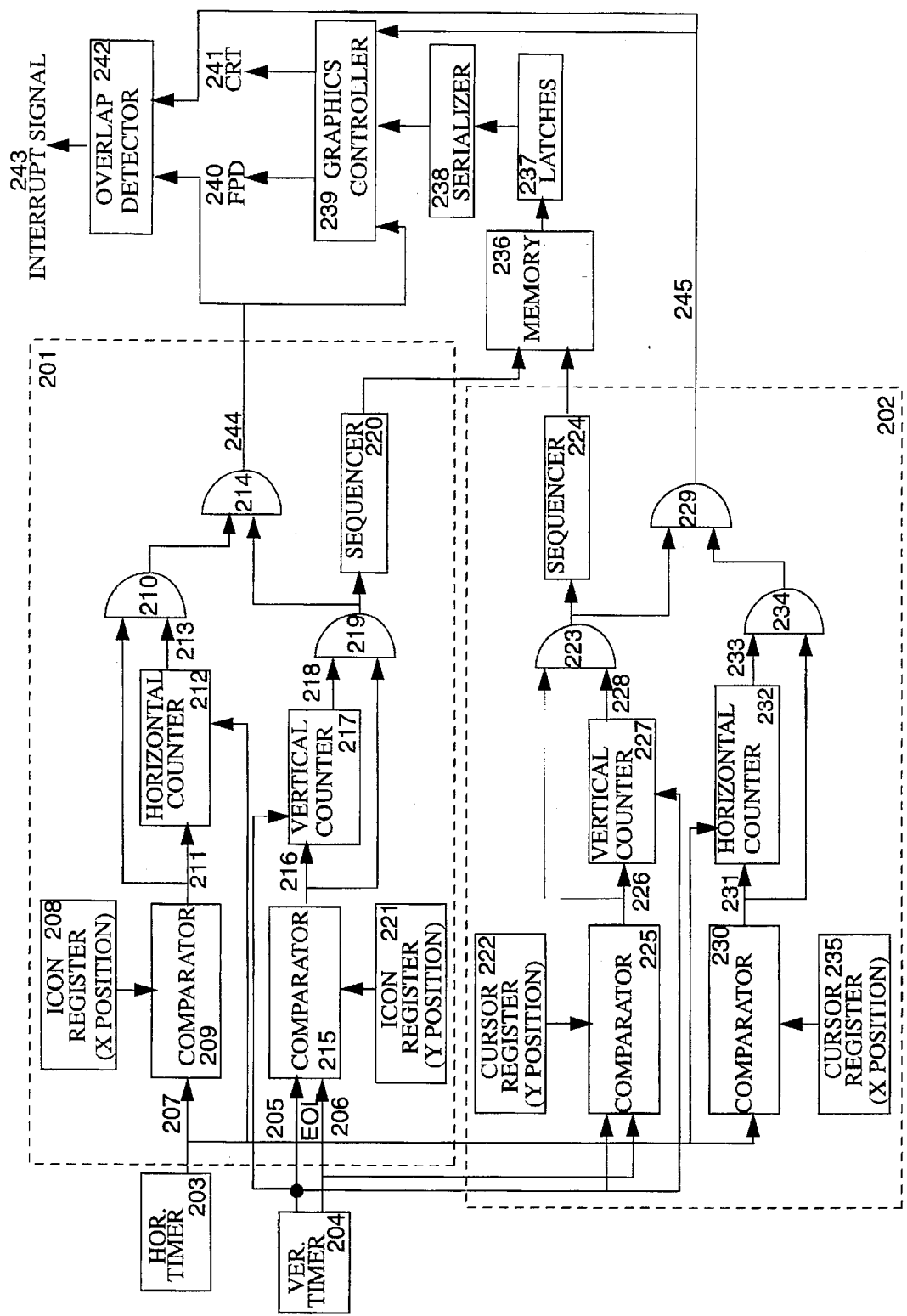
FIG. 2 illustrates a block diagram of the hardware used in the present invention to generate hardware icons and hardware cursors.

FIG. 2 is a block diagram of the hardware 107 and 108 used in generating hardware icons and hardware cursors. More specifically, the hardware used to generate hardware icons is represented by reference designator 201 and the hardware used to generate hardware cursors is represented by reference designator 202. As discussed in the Background, icons and cursors are similar but perform different functions. Except for a few minor differences, such as sequencing memory addresses in which the bit maps for the hardware icons and cursors are stored, the hardware used in generating icons and cursors is substantially similar. For the sake of brevity and to avoid redundancy, the preferred embodiment of the hardware used in generating H/W icons is discussed in detail and is applicable to H/W cursors as well.

In the preferred embodiment, icon registers 208 and 221 store the horizontal and vertical coordinates of the desirable icon display position respectively. Registers 222 and 235 are used to store the horizontal and vertical coordinates of the desirable cursor display position. To generate the icon at the desirable display location, the icon horizontal-vertical coordinates are compared to the current value of horizontal timer 203 and vertical timer 204 respectively. Horizontal timer 203 has the capability to keep track of the pixel pulse count and feeds the current pixel pulse value 207 to comparator 209 and horizontal counter 212. Comparator 209 compares this value with the horizontal coordinate value provided by icon register 208. When pixel pulse value 207 is equal to the horizontal coordinate value, a high horizontal start signal 211 is generated by comparator 209 which triggers horizontal counter 212 to start counting. Horizontal counter 212 is programmed to a value that accommodates the desired width of the H/W icon. When pixel pulse value 207 reaches the programmed value, horizontal counter 203 generates horizontal kill signal 213 to limit the icon width. Normally, kill signal 213 is high but becomes low when the value of horizontal counter 203 reaches its programmed value. Horizontal start signal 211 and kill signal 213 are fed into AND gate 210. As such, horizontal enable signal, the output of AND gate 210, becomes low when either horizontal start signal 211 or kill signal 213 is low. In other words, horizontal counter 212 controls the width of the H/W icon that is to be displayed.

Similarly, vertical timer 204 has the capability to keep track of the line count and provides the current line count value 205 to comparator 215 and vertical counter 217. Additionally, vertical timer 204 is also capable of determining and signaling externally when an end-of-line (EOL) is encountered. Comparator 215 compares current line count 205 with the vertical coordinate value provided by icon register 221. When line count 205 is equal to the vertical coordinate value, a high vertical start signal 216 is generated by comparator 215 which triggers vertical counter 217 to start counting. Vertical counter 217 is programmed to a value that accommodates the desired height of the H/W icon. When line count 205 reaches the programmed value, vertical counter 217 generates vertical kill signal 218 to limit the icon height. Normally, vertical kill signal 218 is high but becomes low when the value of vertical counter 217 reaches its programmed value. In the preferred embodiment, vertical start signal 216 and kill signal 218 are fed into AND gate 219. As such, vertical enable signal, the output of AND gate 219, becomes low when either start signal 216 or kill signal 218 is low. In other words, vertical counter 217 controls the height of the H/W icon that is to be displayed.

With respect to displaying the icon, the output of AND gate 219 is used in triggering sequencer 220 to select the memory addresses in which data related to the icon or icons to be displayed are stored. Sequencer 220 provides the flexibility to access as many addresses in memory 236 as necessary. Latches 237 are used to control the flow of data from memory into serializer 238. Serializer 238 arranges the icon data in the proper order and format before feeding it to graphics controller 239 that drives a Cathode-Ray-Tube (CRT) and/or a Flat Panel Display (FPD) for display. To ensure that hardware icons that are being generated remain within their desired dimensions, output signal 244 of AND gate 214 is input to graphics controller 239 as a hardware icon enable signal. The input signals of AND gate 214 are the output of AND gates 210 and 219 and the horizontal and vertical enable signals respectively. In other words, hardware icon enable signal 244 of AND gate 214 is high if both the icon's height and width are within the desired limits and is low if they are not.

FIG. 2. also illustrates a block diagram of the hardware used in determining whether a hardware icon overlaps a hardware cursor. This determination can be made using the same hardware used in generating icons and cursors which are described in detail above in combination with overlap detector 242. As shown, signal outputs 244 (i.e., hardware icon enable signal) and 245 (i.e., hardware cursor enable signal) are input into overlap detector 242. When both signals 244 and 245 are high, both a H/W icon and a H/W cursor are being generated. In the current invention, hardware icons and cursors are generated using the same horizontal timer 203 and vertical timer 204. The use of the same timers provides a common frame of reference for the purpose of comparison. Such common frame of reference can also be achieved by synchronizing two different timing signals. As such, when both signals 244 and 245 are simultaneously high, they indicate that the icon and cursor are overlapped.

Figure 3A:
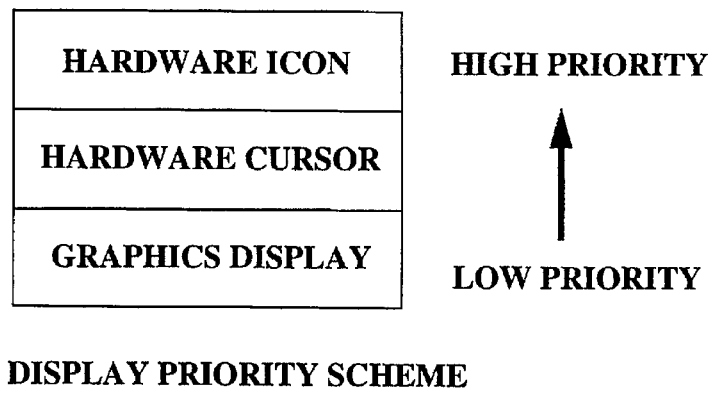
FIG. 3A illustrates the display priority scheme in the prior art.
Figure 3B:
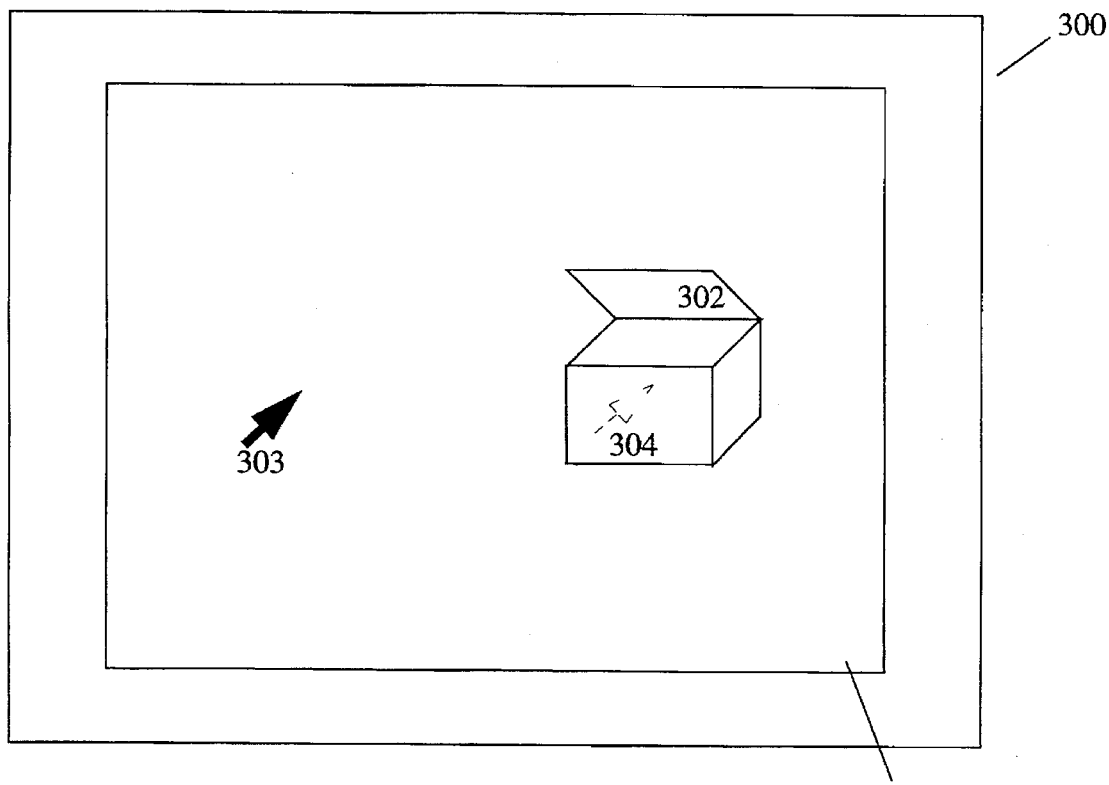
FIG. 3B illustrates how hardware cursors, hardware icons, and software-based graphics are displayed relative to each other in the prior art.
Figure 4A:
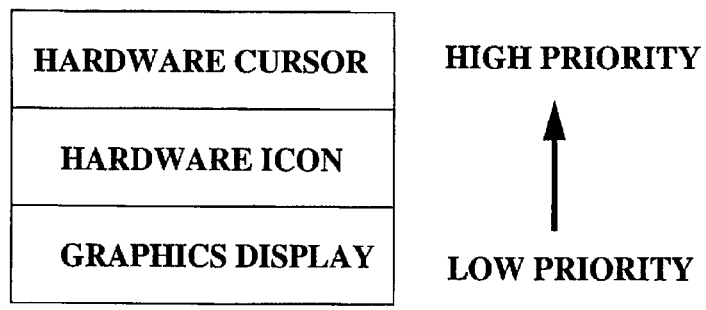
FIG. 4A illustrates the display priority scheme of the present invention.
Figure 4B:
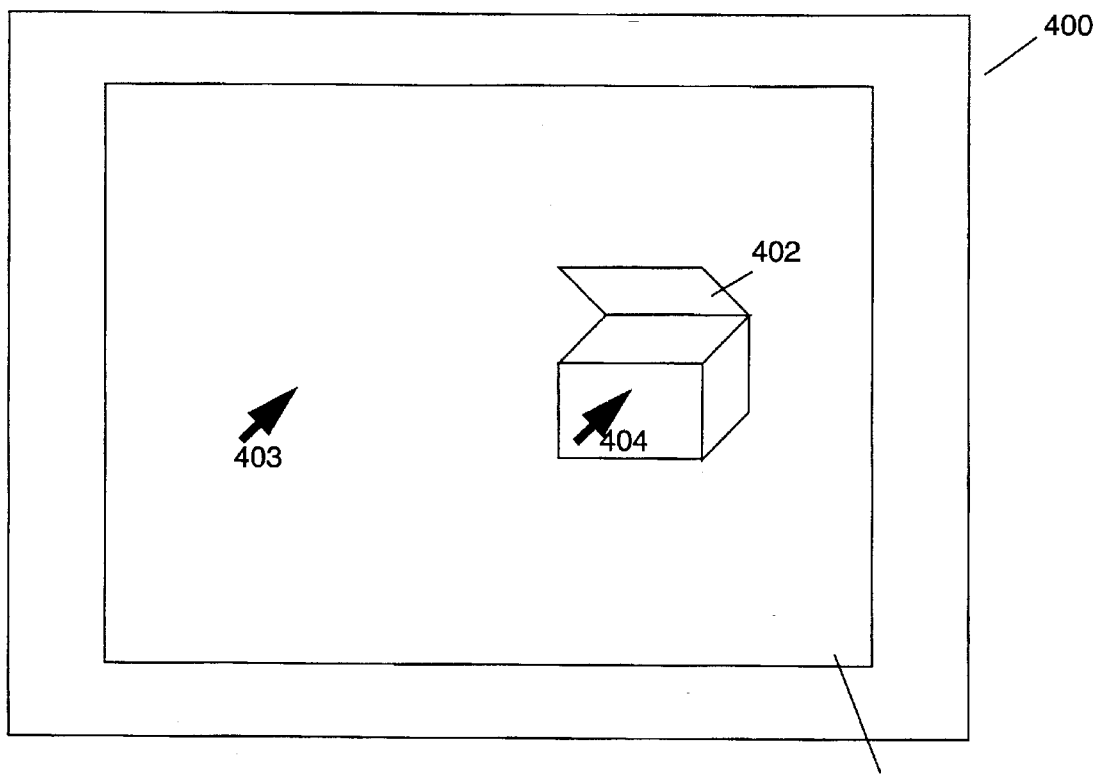
FIG. 4B illustrates how hardware cursors, hardware icons, and software-based graphics are displayed relative to each other in the present invention.

As discussed in the Background, the priority scheme of the prior art, illustrated by FIG. 3A, inhibits using a hardware cursor to manipulate hardware icons. In short, visual observation of a hardware cursor is impeded by a hardware icon when the two overlap. This scenario is illustrated in FIG. 3B. Consequently, it is difficult to use hardware icons in graphically representing computer commands or controls. The present invention devises a new priority scheme to facilitate the selection and manipulation of hardware icons using a hardware cursor. This is achieved by switching the priority of hardware cursors and icons. This new priority scheme is illustrated by FIG. 4A. By giving a hardware cursors higher priority than hardware icons, a hardware cursor does not go under and consequently is not hidden by the hardware icon when the cursor is pointed at the icon (i.e., when they overlap each other). This scenario is illustrated in FIG. 4B. As a result, a user can visually observe a hardware cursor relative to hardware icons when he directs the cursor at the icon for the purpose of manipulation. The ability to visualize the hardware cursor while selecting or manipulating hardware icons becomes greatly reduced when there are multiple hardware icons displayed in close proximity of each other on the monitor screen. When this situation occurs, it is difficult to determine at which icon the cursor is pointed.

Figure 5:
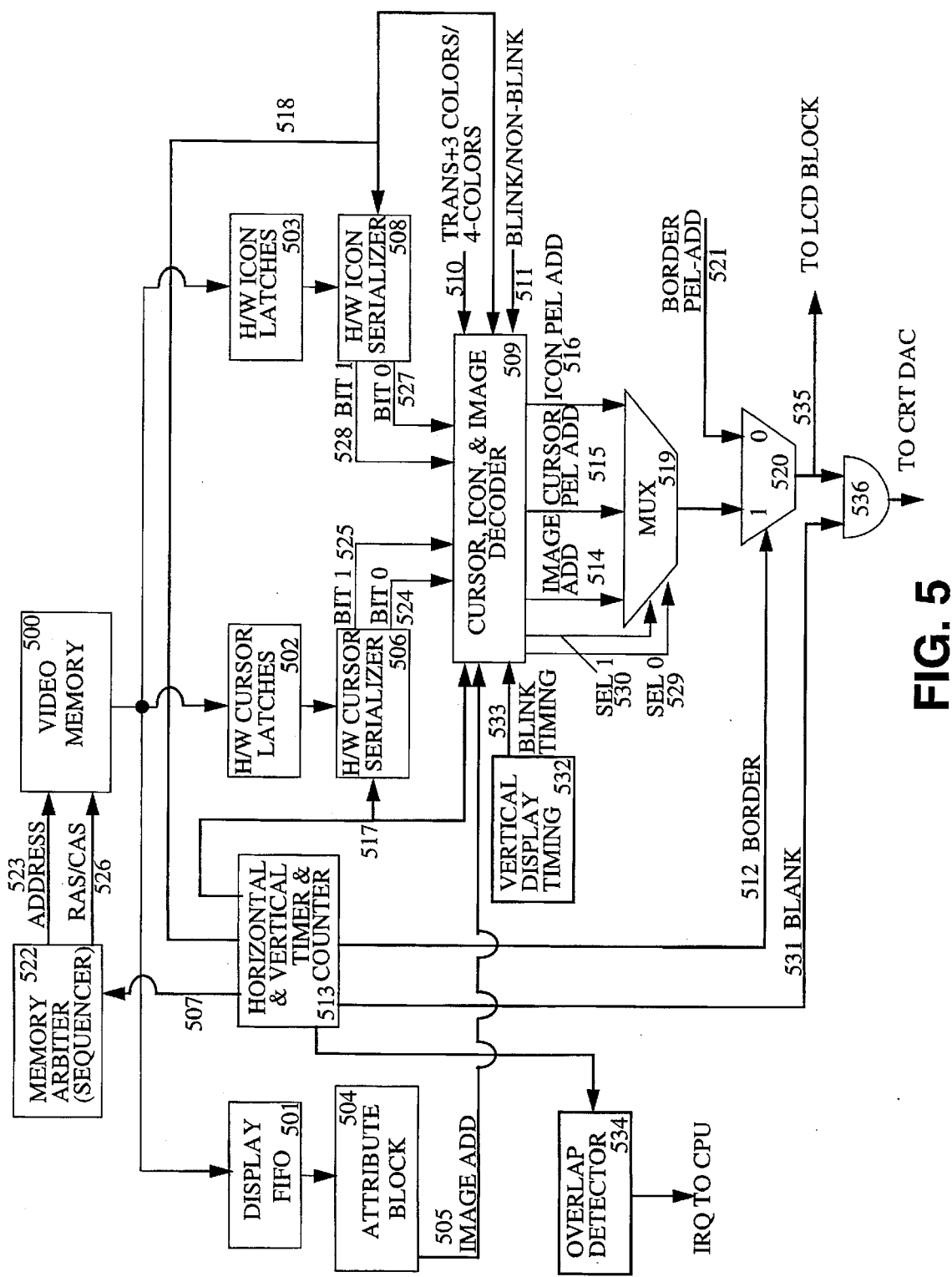
FIG. 5 illustrates a block diagram of the hardware used in implementing the display priority scheme of the present invention.

FIG. 5 shows how the new priority scheme is implemented in the present invention. Bitmap data of various hardware icons and cursors are stored in video memory 500, shown in FIG. 1 and FIG. 2 as elements 104 and 236 respectively. Likewise, the bitmap data for software-based graphics images is also stored in video memory 500. To display software-based graphics images such as display screen background, bitmap data associated with these images is retrieved from video memory 500 and stored in display FIFO 501. Once stored, display FIFO 501 sends the bitmap data to attribute block 504. Display FIFO also sends a signal to attribute block 504 to inquire about the graphics images' attributes (i.e., color or monochrome, foreground or background, blink or non-blink). In other words, attribute block provides a look-up map of software-based graphics images' attributes. Upon retrieving this information, attribute block 504 sends image add signal 505 to cursor, icon, & image (CII) decoder 509. Image add signal 505 includes data for software-based graphics images together with its attributes.

With respect to hardware cursors, horizontal and vertical (H & V) counter 513 keeps track of both the display's current vertical line and horizontal pixel to determine whether the current display position is within the desired hardware cursor position. H & V counter 513 corresponds to units 201 and 202 (without sequencers 220 and 224) in FIG. 2. When such an overlap occurs, H & V counter 513 sends fetch request signal 507 to memory arbiter 522. H & V counter 513 also provides hardware cursor display window signal 517 to both H/W cursor serializer 506 and CII decoder 509. Upon receiving fetch request signal 507, memory arbiter 522 selects the starting memory address in which the bitmap data related to the cursor to be displayed is stored by sending address signal 523 to video memory 500. Memory arbiter 522 also sends RAS/CAS signal 526 to video memory 500. Address signal 523 acts together with RAS/CAS signal 526 to retrieve the cursor bitmap data from video memory 500. The cursor bit map data is fed into H/W cursor latches 502 to better control data transfer into H/W cursor serializer 506. When hardware cursor display window signal 517 triggers cursor serializer 506, cursor serializer 506 reformats cursor bitmap data and provides the reformatted data to CII decoder 509 in series via cursor bit(0) 524 and cursor bit(1) 525. Each cursor pixel data is now represented by 2 binary bits (cursor bit(0) and cursor bit(1)).

Similarly, H & V counter 513 keeps track of both the display's current vertical line and horizontal pixel to determine whether the current display position is within the desired hardware icon position. When such an overlap occurs, H & V counter 513 sends fetch request signal 507 to memory arbiter 522. H & V counter 513 provides hardware icon display window signal 518 to both H/W icon serializer 506 and CII decoder 509. Upon receiving fetch request signal 507, memory arbiter 522 selects the starting memory address in which the bitmap data related to the H/W icon to be displayed is stored by sending an address signal 523 to video memory 500. Memory arbiter 522 also sends RAS/CAS signal 526 to video memory 500. Address signal 523 acts together with RAS/CAS signal 526 to retrieve the icon bitmap data from video memory 500. The icon bitmap data is fed into H/W icon latches 503 to better control data transfer into H/W icon serializer 508. When hardware icon display window signal 518 triggers icon serializer 508, icon serializer 508 reformats icon bitmap data and provides the reformatted data to CII decoder 509 in series via icon bit(0) 527 and icon bit(1) 528. Each icon pixel data is now represented by 2 binary bits (icon bit(0) and icon bit(1)).

CII decoder 509 is synchronized with H/W cursor serializer 506 and icon serializer 508, respectively by cursor display window signal 517 and icon display window signal 518. Both signals originate from H & V counter 513. Additionally, CII decoder 509 also receives as inputs "transparent+3 colors/4 colors" signal 510 and blink/non-blink signal 511. These signals control whether the hardware icon generated will have 3 colors plus transparency or 4 colors and whether the hardware icon will be blinking or not. Vertical display timing 532 provides CII decoder 509 with the blinking time period via the blink timing signal 533. These attributes are incorporated into icon pel add signal 516 which is an output of CII decoder 509. CII decoder 509 also outputs image add signal 514 and cursor pel-add signal 515. These three signals are provided as inputs to multiplexer 519.

To aid multiplexer 519 in selecting its output based on the present invention's priority scheme, CII decoder 509 outputs select signals 529 sel(0) and 530 sel(1). Depending on the values of select signals 529 and 530, multiplexer 519 outputs either image add 514, cursor pel add 515, or icon pel add 516. FIG. 6 shows the selection code used by multiplexer 519 in generating its output. CII decoder 509 generates select signals 529 and 530 based on the following inputs: cursor display window 517, icon display window 518, and image_add 505. How select signals sel(0) and sel(1) are generated will be discussed in detail shortly below.

The output of multiplexer 519 and border pixel address signal 521 are provided as inputs to multiplexer 520. Border pixel address signal 521 is normally the output of multiplexer 520 because the icon, cursor, or graphics image are not displayed unless they are inside the display border. However, when border signal 512 is high, signifying that the object is inside the screen border, multiplexer 520 outputs signal 535 which is fed to the LCD display circuitry for display on an LCD. With respect to a CRT display, AND gate 536 couples output signal 535 with a blank signal 531 generated by H & V counter 513. Blank signal 531 blanks the border of each display frame prior to sending the signal to the CRT DAC.

Finally, by keeping track of the display's current vertical line and horizontal pixel, H & V Counter 513 helps overlap detector 534 to determine whether a hardware icon overlaps a hardware cursor. Overlap detection was previously described in this section. Upon detecting an overlap, overlap detector 534 generates an interrupt signal to the CPU.

Figure 7:
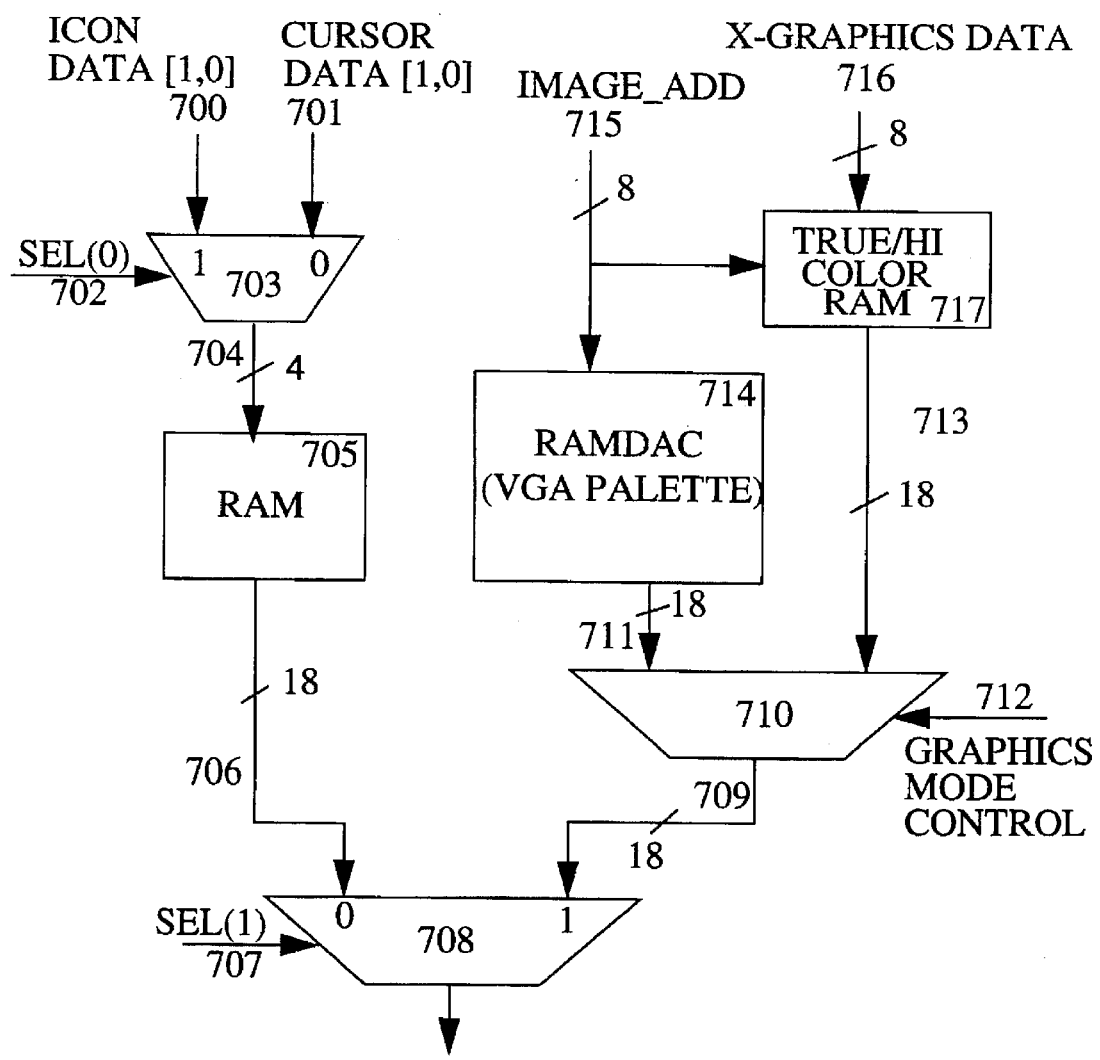
FIG. 7 illustrates an alternative embodiment of how to multiplex between software-based graphics data, hardware cursor data, and hardware icon data.

An alternative embodiment of how to multiplex image_add 514, cursor pel add signal 515, and icon pel add signal 516 is presented next. FIG. 7 illustrates this alternative embodiment. FIG. 7 shows icon data 700 and cursor data 701, represented by series of icon bits[0,1] (shown in FIG. 5 as icon bit(0) 527 and icon bit(1) 528) and cursor bits[0,1] (shown in FIG. 5 as cursor bit(0) 524 and cursor bit(1) 525), being provides as inputs to multiplexer 703. Multiplexer 703 selects either icon data 700 or cursor data 701 as its output 704 based on signal sel(0) 702 (shown in FIG. 5 as signal sel(0) 529). When signal sel(0) 702 is high, multiplexer 703 outputs icon data 700. Conversely, when signal sel(0) 701 is low, multiplexer 703 outputs cursor data 701. This is consistent with the selection code shown in FIG. 6. Output signal 704 is provided to random access memory 705 in order to color-map each pixel data. Memory 705 outputs 18-bits signal 706 to represent icon/cursor pixel data. Each pixel is now represented by 18 bits, 6 bits for the color red, 6 bits for the color green, and 6 bits for the color blue. Signal 708 is provided as an input to multiplexer 708.

To color-map software-based graphics data, image_add signal 715 (shown in FIG. 5 as signal 505) is provided as an input to random access memory-digital analog converter 714. Memory 714 outputs 18-bit signal 711 to represent graphics pixel data. As with icon and cursor pixel data, each graphics pixel is represented by 18 bits, 6 bits for red, 6 bits for green, and 6 bits for blue. To add even more colors for software-based graphics, image_add signal 715 is also provided as an input to true/hi color memory 717. To provide the information required for additional colors for "true color" and "hi color" modes, X-graphics data signal 716 is provided as an input to memory 717. True/hi color memory 717 outputs 18-bit signal 713. Both 18-bit signals 711 and 713 are provided as input to multiplexer 710. Multiplexer 710 selects either signal 711 or 713 as its outputs depending on which graphics mode (i.e., regular or true/hi color) is desired. Graphics mode selection is controlled by signal 712. Output signal 709 of multiplexer 710 is provided as a second input to multiplexer 708. Multiplexer 708 selects either icon/cursor pixel data signal 706 or software-based graphics pixel data signal 709 as its output based on signal sel(1) 707 (shown in FIG. 5 as signal sel(1) 530). Multiplexer 708 outputs graphics pixel data when signal sel(1) 707 is high and it outputs icon/cursor pixel data when signal sel(1) 707 is low. This is consistent with the selection code shown in FIG. 6.

Figure 8A:
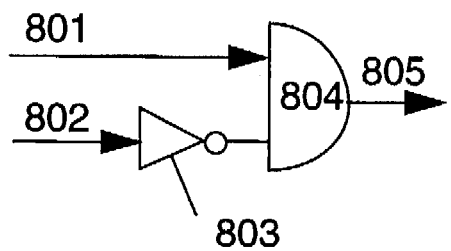
FIG. 8A illustrates a block diagram of the hardware used in generating signal sel(0).
Figure 8B:
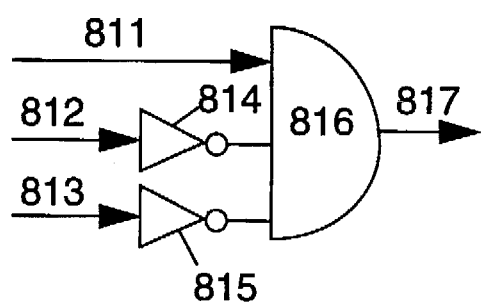
FIG. 8B illustrates a block diagram of the hardware used in generating signal sel(1).

Our attention is now turned to how signals sel(0) and sel(1) are generated. Signal sel(0) is generated based on the logical equation: sel(0)=icon_window*cursor_window. This logic is illustrated in FIG. 8A in which icon display window signal 801 (shown as signal 518 in FIG. 5) and the invert of cursor display window signal 802 (shown as signal 517 in FIG. 5) are provided as inputs into AND gate 804. Inverter 803 inverts cursor display window signal 802 prior to sending it to AND gate 805. AND gate 804 provides signal sel(0) 805 as its output. With respect to signal sel(1), signal sel(1) is generated based on the logical equation: sel(1)=graphics*icon_window*cursor_window. This logic is illustrated in FIG. 8B in which image_add signal 811 (shown as signal 505 in FIG. 5), the invert of cursor display window signal 812 (shown as signal 802 in FIG. 8A), and the invert of icon display window signal 813 (shown as signal 801 in FIG. 8B) are provided as inputs into AND gate 816. Inverters 814 and 815 invert signals 812 and 813 respectively prior to sending them to AND gate 816. AND gate 817 sends signal sel(1) 817 as its output.

The above disclosure of the preferred embodiment of the invention presents the best mode in carrying out the invention. From the above description, embodiments in various other combinations and modifications that are still within the scope of the current invention will readily be apparent to those skilled in the art.

We claim:

1. A system for displaying images comprising:
   a first hardware circuit for generating icons to be displayed;
   a second hardware circuit for displaying cursors to be displayed;
   an overlap detector responsive to said icons and said cursors for detecting an overlap between their positions on a display;
   a display selector for displaying said cursors and suppressing portions of said icons that coincide with said cursors on said display;
   a timer circuit responsive to said first hardware circuit and said second hardware circuit for providing a common frame of reference in generating said icons and said cursors, wherein a horizontal and a vertical timing signal are synchronized responsive to said common frame of reference to generate a single timing signal to generate said icons and said cursors;
   wherein upon said horizontal timing signal and said vertical timing signal being simultaneously asserted high, said icon and said cursor overlap; and
   a priority setter responsive to said second hardware circuit for selectively setting display priority to said cursor to be displayed when said icon and said cursor overlap.

2. The system of claim 1, wherein said display selector enables said cursors to be displayed and suppresses portions of said graphics images that coincide with said cursors on said display.

3. The system of claim 1, wherein said display selector enables said icons to be displayed and suppresses portions of said graphics images that coincide with said icons on said display.

4. The system of claim 1, wherein said display selector is responsive to a color control signal to form said icons of a predetermined color.

5. The system of claim 1, wherein said display selector is responsive to a transparency control signal to enable said icons to be transparent when said icon and said cursor overlap.

6. The system of claim 1, wherein said display selector is responsive to a blink control signal to provide blinking of said icons with a predetermined blinking period.

7. The system of claim 1, wherein said overlap detector generates an interrupt signal supplied to a central processor to control said display selector when said overlap is detected.

8. The system of claim 1, wherein said first hardware circuit comprises a horizontal control circuit for controlling the width of an icon to be displayed, and a vertical control circuit for controlling a height of said icon to be displayed.

9. The system of claim 8, wherein said horizontal control circuit comprises a horizontal comparator to compare horizontal counts representing a current horizontal position of a pixel to be displayed with predetermined values representing positions along a horizontal axis.

10. The system of claim 9, wherein said horizontal control circuit further comprises a horizontal counter triggered by said horizontal comparator to count said horizontal counts.

11. The system of claim 10, wherein said horizontal counter provides a terminating signal to limit the width of said icon when a predetermined number of said horizontal counts are supplied to its input.

12. The system of claim 8, wherein said vertical control circuit comprises a vertical comparator to compare vertical counts representing a current vertical position of a line to be displayed with predetermined values representing positions along a vertical axis.

13. The system of claim 12, wherein said vertical control circuit further comprises a vertical counter triggered by said vertical comparator to count said vertical counts.

14. The system of claim 13, wherein said vertical counter provides a terminating signal to limit the height of said icon when a predetermined number of said vertical counts are supplied to its input.

15. The system of claim 1, wherein said second hardware circuit comprises a horizontal control circuit for controlling the width of said cursor to be displayed, and a vertical control circuit for controlling a height of said cursor to be displayed.

16. The system of claim 15, wherein said horizontal control circuit comprises a horizontal comparator to compare horizontal counts representing a current horizontal position of a pixel to be displayed with predetermined values representing position along a horizontal axis.

17. The system of claim 16, wherein said horizontal control circuit further comprises a horizontal counter triggered by said horizontal comparator to count said horizontal counts.

18. The system of claim 17, wherein said horizontal counter provides a terminating signal to limit the width of said cursor when a predetermined number of said horizontal counts are supplied to its input.

19. The system of claim 15, wherein said vertical control circuit comprises a vertical comparator to compare vertical counts representing a current vertical position of a line to be displayed with predetermined values representing position along a vertical axis.

20. The system of claim 19, wherein said vertical control circuit further comprises a vertical counter triggered by said vertical comparator to count said vertical counts.

21. The system of claim 20, wherein said vertical counter provides a terminating signal to limit the height of said cursor when a predetermined number of said vertical counts are supplied to its input.

22. An apparatus for generating a hardware icon to communicate with a computer CPU comprising:
 a horizontal control circuit for controlling the width of said icon to be displayed; said horizontal control circuit comprises:
  a) a horizontal comparator to compare horizontal counts representing a current horizontal position of a pixel to be displayed with predetermined values representing positions along a horizontal axis;
  b) a horizontal counter triggered by said horizontal comparator to count said horizontal counts; said horizontal counter provides a terminating signal to limit the width of said icon when a predetermined number of said horizontal counts are supplied to its input; and
 a vertical control circuit for controlling the height of said icon to be displayed; said vertical control circuit comprises:
  a) a vertical comparator to compare vertical counts representing a current vertical position of a line to be displayed with predetermined values representing positions along a vertical axis;
  b) a vertical counter triggered by said vertical comparator to count said vertical counts; said vertical counter provides a terminating signal to limit the height of said icon when a predetermined number of said vertical counts are supplied to its input.

23. An apparatus for generating a hardware icon and a hardware cursor to communicate with a computer CPU comprising:
 means for keeping track of and synchronizing a video display's horizontal pixel pulse count for generating both said hardware icon and said hardware cursor;
 means for keeping track of and synchronizing said video display's vertical line count for generating both said hardware icon and said hardware cursor;
 means for storing said icon's desired horizontal position;
 means for comparing said video display's current horizontal pixel pulse count with said hardware icon's desired horizontal position to determine whether said pulse count is equal to or greater than said desired horizontal position, said determination triggers an icon horizontal start signal;
 means for ensuring the horizontal dimension of said hardware icon is within its desired limit comprising means for storing said limit, means for determining when said horizontal dimension of said hardware icon exceeds said limit, and means for outputting an icon horizontal kill signal;
 means for coupling said icon horizontal kill signal with said icon horizontal start signal to determine whether to output an icon horizontal enable signal;
 means for storing said icon's desired vertical position;
 means for comparing said video display's current vertical pixel pulse count with said hardware icon's desired vertical position to determine whether said pulse count is equal to or greater than said desired vertical position, said determination triggers an icon vertical start signal;
 means for ensuring the vertical dimension of said hardware icon is within its desired limit comprising means for storing said limit, means for determining when said vertical dimension of said hardware icon exceeds said limit, and means for outputting an icon vertical kill signal;
 means for coupling said icon vertical kill signal with said icon vertical start signal to determine whether to output an icon vertical enable signal;
 means for coupling said icon horizontal enable signal with said icon vertical enable signal to determine whether to output an icon enable signal;
 means for storing said cursor's desired horizontal position;
 means for comparing said video display's current horizontal pixel pulse count with said hardware cursor's desired horizontal position to determine whether said pulse count is equal to or greater than said desired horizontal position, said determination triggers a cursor horizontal start signal;
 means for ensuring the horizontal dimension of said hardware cursor is within its desired limit comprising means for storing said limit, means for determining when said horizontal dimension of said hardware cursor exceeds said limit, and means for outputting a cursor horizontal kill signal;
 means for coupling said cursor horizontal kill signal with said cursor horizontal start signal to determine whether to output a cursor horizontal enable signal;
 means for storing said cursor's desired vertical position;
 means for comparing said video display's current vertical pixel pulse count with said hardware cursor's desired vertical position to determine whether said pulse count is equal to or greater than said desired vertical position, said determination triggers a cursor vertical start signal;
 means for ensuring the vertical dimension of said hardware cursor is within its desired limit comprising means for storing said limit, means for determining when said vertical dimension of said hardware cursor exceeds said limit, and means for outputting a cursor vertical kill signal;
 means for coupling said cursor vertical kill signal with said cursor vertical start signal to determine whether to output a cursor vertical enable signal;
 means for coupling said cursor horizontal enable signal with said cursor vertical enable signal to determine whether to output a cursor enable signal;
 means for storing data associated with said hardware icon and cursor;
 means for controlling the display of said data associated with said hardware icon and said hardware cursor on different display systems, said output of said hardware cursor data is enable by said cursor enable signal, said output of said hardware icon data is enable by said icon enable signal; and
 means for detecting the overlap of said hardware icon and said hardware cursor based on said cursor enable signal and said icon enable signal, said overlap detection triggers an interrupt signal.

24. The apparatus of claim 23, further comprising sequencing means for accessing said storing means to selectively retrieve said hardware cursor data or said hardware icon data for display.

25. The apparatus of claim 24, further comprising a latching means for controlling the flow of said hardware cursor data and said hardware icon data from said storing means to said controller.

26. The apparatus of claim 25, further comprising a serializing means for formatting said hardware cursor data and said hardware icon data prior to inputting to said controller.

27. A method for generating a hardware icon and a hardware cursor to communicate with a computer CPU comprising the steps of:
- comparing said hardware icon's desired horizontal position with a video display's horizontal pixel pulse count to determine whether said pixel pulse count matches with said desired horizontal position;
- comparing said hardware icon's desired vertical position with said video display's vertical line count to determine whether said line count matches with said desired vertical position;
- ensuring the vertical and horizontal dimensions of said hardware icon are within the desired limits;
- comparing said hardware cursor's desired horizontal position with said video display horizontal pixel pulse count to determine whether said pixel pulse count matches with said desired horizontal position;
- comparing said hardware cursor's desired vertical position with said video display vertical line count to determine whether said line count matches with said desired vertical position;
- ensuring the vertical and horizontal dimensions of said hardware cursor are within the desired limits; and
- displaying graphics data associated with said hardware icon and graphics data associated with said hardware cursor together on different display systems.

28. The method of claim 27 further comprises the step of detecting whether said hardware icon overlaps said hardware cursor by synchronizing said video display's horizontal pixel pulse for generating both said hardware icon and said hardware cursor and by synchronizing said video display's vertical line count for generating both said hardware icon and said hardware cursor.

29. An apparatus for implementing a display priority scheme to allow a hardware cursor manipulate a hardware icon, said apparatus comprising:
- a priority decoder for determining the display priority between a hardware cursor and a hardware icon wherein said display priority is based on the display priority scheme that a hardware cursor data input has first priority followed by a hardware icon data input and wherein if a hardware cursor is displayed, overlapping portions of said hardware icons is suppressed;
- a selection code triggered by said priority decoder for selecting said hardware cursor over said hardware icon; and
- means for multiplexing data representative of said hardware icon and hardware cursor wherein said multiplexing process is responsive to said selection code.

30. The apparatus in claim 29 wherein said display priority determined also depends on whether the hardware icon is intended to be transparent or in color, blinking or non-blinking.

31. A method for implementing a display priority scheme to allow a hardware cursor to manipulate a hardware icon comprising the steps of:
- incorporating said display priority scheme wherein hardware cursor graphics data has first priority followed by hardware icon graphics data and software-based graphics data; and
- multiplexing said software-based graphics data, said hardware icon graphics data, and said hardware cursor graphics data based on said display priority scheme.

32. The method in claim 31 wherein said step of incorporating said display priority scheme further comprises the step of incorporating hardware icon attributes of transparency, color, blinking, or non-blinking as factors in said priority scheme.

* * * * *